US010231105B2

United States Patent
Rune et al.

(10) Patent No.: US 10,231,105 B2
(45) Date of Patent: Mar. 12, 2019

(54) TOPOLOGY DATABASE FOR APPLICATION SERVICE SUPPORT AT ACCESS NODES

(71) Applicant: Telefonaktiebolaget LM Ericsson (publ), Stockholm (SE)

(72) Inventors: Johan Rune, Lidingö (SE); Lars Westberg, Enköping (SE); Vinay Yadhav, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/547,827

(22) PCT Filed: Feb. 5, 2015

(86) PCT No.: PCT/SE2015/050129
§ 371 (c)(1),
(2) Date: Aug. 1, 2017

(87) PCT Pub. No.: WO2016/126178
PCT Pub. Date: Aug. 11, 2016

(65) Prior Publication Data
US 2018/0020316 A1    Jan. 18, 2018

(51) Int. Cl.
*H04W 4/60* (2018.01)
*H04W 36/00* (2009.01)
(Continued)

(52) U.S. Cl.
CPC .............. *H04W 4/60* (2018.02); *H04W 4/20* (2013.01); *H04W 36/0061* (2013.01);
(Continued)

(58) Field of Classification Search
CPC ............... H04W 4/60; H04W 36/0005; H04W 36/0011; H04W 36/0033; H04W 76/10; H04W 92/20
See application file for complete search history.

(56) References Cited

U.S. PATENT DOCUMENTS

2013/0150039 A1    6/2013  Ramle et al.
2014/0022985 A1*   1/2014  Kalmbach ............. H04W 88/08
                                                              370/328

FOREIGN PATENT DOCUMENTS

WO    2013175170 A1    11/2013
WO    2014008955 A1    1/2014

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.

(Continued)

*Primary Examiner* — Scott M Sciacca
(74) *Attorney, Agent, or Firm* — Patent Portfolio Builders, PLLC

(57) ABSTRACT

An access node (110A, 110B) of a cellular network receives a message (301, 303, 305, 308) from a further access node (110A, 110B) of the cellular network. From the received message (301, 303, 305, 308), the access node extracts topology information indicating one or more application services provided by an application service platform located at the further access node. Further, the access node (110A, 110B) stores the topology information in a topology database (180A, 180B).

15 Claims, 5 Drawing Sheets

(51) Int. Cl.
*H04W 92/20* (2009.01)
*H04W 4/20* (2018.01)
*H04W 76/10* (2018.01)
*H04W 84/04* (2009.01)
*H04W 88/08* (2009.01)

(52) U.S. Cl.
CPC .......... *H04W 76/10* (2018.02); *H04W 84/042* (2013.01); *H04W 88/08* (2013.01); *H04W 92/20* (2013.01)

(56) References Cited

OTHER PUBLICATIONS

3GPP, "3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.3.0, Sep. 2014, 1-153.

* cited by examiner

TOPOLOGY DATABASE FOR APPLICATION SERVICE SUPPORT AT ACCESS NODES

TECHNICAL FIELD

The present invention relates to methods for supporting application services in a cellular network and to corresponding devices.

BACKGROUND

In cellular networks, it is known to provide various kinds of application services. Conventionally, such application services are provided by an application server, and a user may access such application services through a user equipment (UE) connected to the cellular network.

In this connection, an idea that is gaining increased attention is the possibility to deploy a cloud platform for application services closer to the users in cellular networks, in particular in a radio access network (RAN) part of the cellular network. Such cloud platform may be implemented by multiple application service platforms distributed over different sites in the RAN. Accordingly, when the UE is connected to a given access node of the RAN, the application service platform which is closest to this access node may be utilized for providing the application services to the UE. This may help to reduce the amount of transport network bandwidth required for the traffic associated with the application services. Further, also a better user experience may be achieved, e.g., by allowing for reduced round-trip delays or smart interactions between the cloud platform and network elements.

When using such distributed application service platforms, the mobility of the UE in the cellular network raises some issues. For example, an ongoing session of an application service established by a UE may need to be migrated to another application service platform when the UE moves within the cellular network. Further, an appropriate application service platform may need to be selected when the UE newly initiates a session of an application service. For example due to variations in the number and types of supported application services at the various distributed application service platforms, this may be a complex task.

Accordingly, there is a need for techniques which allow for efficiently supporting the utilization of application services provided by application service platforms in a cellular network.

SUMMARY

According to an embodiment of the invention, a method of supporting application services in a cellular network is provided. According to the method, an access node of the cellular network receives a message from a further access node of the cellular network. From the received message, the access node extracts topology information indicating one or more application services provided by an application service platform located at the further access node. Further, the access node stores the topology information in a topology database.

According to a further embodiment of the invention, an access node for a cellular network is provided. The access node comprises an interface with respect to a further access node. The access node is configured to receive, via the interface, a message from a further access node of the cellular network. Further, the access node is configured to extract, from the received message, topology information indicating one or more application services provided by an application service platform located at the further access node. Further, the access node is configured to store the topology information in a topology database.

According to a further embodiment of the invention, a computer program or computer program product is provided, e.g., in the form of a non-transitory storage medium, which comprises program code to be executed by at least one processor of an access node of a cellular network. Execution of the program code causes the access node to receive a message from a further access node of the cellular network. Further, execution of the program code causes the access node to extract, from the received message, topology information indicating one or more application services provided by an application service platform located at the further access node. Further, execution of the program code causes the access node to store the topology information in a topology database.

Details of such embodiments and further embodiments will be apparent from the following detailed description of embodiments.

DETAILED DESCRIPTION OF EMBODIMENTS

Figure 1:
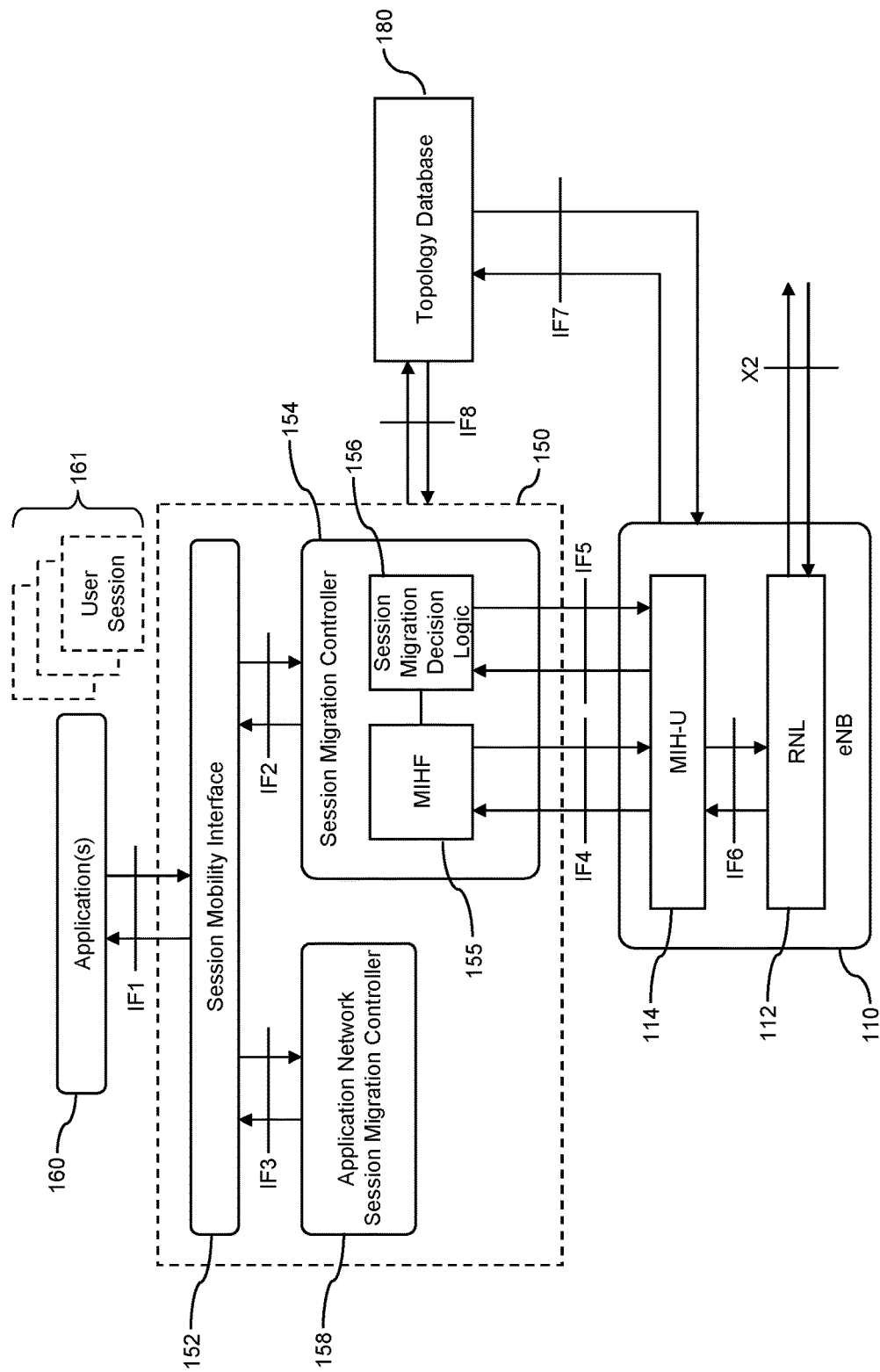
FIG. 1 schematically illustrates an architecture as applied according to an embodiment of the invention for providing an application service platform at an access node.

In the following, concepts in accordance with exemplary embodiments of the invention will be explained in more detail and with reference to the accompanying drawings. The illustrated embodiments relate to supporting utilization of application services in a cellular network. The application services are assumed to be provided by application service platforms located at different access nodes of the cellular network. The application service platforms may also be referred to as a Local Service Cloud (LCS). The application service platforms may be applied within a Platform as a Service (PaaS) model of cloud computing, i.e., the capability provided to the user is to deploy onto the cloud infrastructure user-created or acquired applications created using programming languages, libraries, services, and tools supported by the provider, and the user does not manage or control the underlying cloud infrastructure including network, servers, operating systems, or storage, but has control over the deployed applications and possibly configuration settings for the application-hosting environment. However, other models of providing application services by multiple distributed application service platforms could be applied as well. In the illustrated examples, it is assumed that cellular network is implemented on the basis of LTE (Long Term Evolution) radio access technology as specified by 3GPP ($3^{rd}$ Generation Partnership Project), and the access nodes are assumed to correspond to base stations of the LTE radio access network, referred to as "eNB" (evolved Node B). However, it should be understood that the concepts could also be applied in connection with other radio access technologies, e.g., UMTS (Universal Mobile Telecommunications System) or CDMA2000, and that also other kinds of access nodes may be considered, RNCs (Radio Network Controllers) of the UMTS radio access network.

In the illustrated concepts, a topology database is utilized for maintaining information concerning the application services supported by the different application service platforms in the cellular network. In this connection, an application service may be regarded as being supported by the application service platform if the application service platform executes a corresponding application which makes the application service accessible to users. The information in the topology database may be used as a basis when selecting which of the application service platforms should be utilized for providing a given one of the application services to a certain UE, e.g., when newly setting up a user session of the application service or when the UE moves within the cellular network and user sessions need to be migrated. Such topology database may be provided at each access node of the cellular network, e.g., as a separate node co-located with the access node or as a part of an application service platform co-located with the access node. For efficiently supplying the topology database with the required information, messages transmitted between the access nodes are utilized. Such messages may for example have the purpose of configuring a connection between the access nodes and additionally convey the information on the supported application services. When one of the access nodes receives such message from another one of the access nodes, it extracts the information on the application services supported by the application service platform at the other access node and stores the information in the topology database. Accordingly, the topology database can be efficiently updated.

FIG. 1 shows an example of an architecture which may be utilized at the site of a certain eNB 110. The architecture may be utilized for implementing a network node which combines functionalities of the eNB 110, an application service platform 150, and a topology database 180. Here, it should be understood that such network node may be implemented as a single device or a system of multiple interacting devices.

More specifically, FIG. 1 shows the eNB 110, the application service platform 150, and one or more applications 160 executed on the application service platform 150. The applications 160 have the purpose of providing the application service(s) to users which utilize UEs connected to the cellular network. For this purpose, corresponding application client software may be installed on the UEs. Examples of such application services which may be provided by the application 160 executed on the application service platform 150 include social networking services, media streaming or sharing services, and messaging services. FIG. 1 also illustrates exemplary user sessions 161 of the application service(s).

As illustrated, the application service platform 150 is provided with a session mobility interface 152, a session migration controller 154, and an application network session migration controller 158. The session mobility interface 152 provides a first interface IF1 with respect to the application(s) executed on the application service platform 160. The first interface IF1 may act as an application programming interface (API) for the application(s) 160. This API may for example support freezing execution of the application(s) 160 or communication of information concerning a state of the application(s). Further, the API may also support communication of information concerning the cellular network, as for example available from the eNB 110. The session mobility interface 152 is coupled via a second interface IF2 to the session migration controller 154 and the application network session migration controller 158.

The session migration controller 154 and the application network session migration controller 158 have the purpose of controlling migration of functionalities for providing the application service(s) between the application service platform 150 and other application service platforms in the cellular network. In the case of the session migration controller 154, migration is controlled on a level of the user session(s) 161, which means that the session migration controller 154 controls whether a certain user session 161 or a group of user sessions 161 should be handled by the application service platform 150 or migrated to another application service platform, which may for example occur depending on mobility of the UE through which the user session(s) 161 are established. In the case of the application network session migration controller 158, migration is controlled on a level of the application service(s), which means that the application network session migration controller 158 controls whether a certain application service or group of application services should be handled by the application service platform 150 or migrated to another application service platform. This occurs typically independently of mobility of individual UEs, and may rather consider network conditions, such as available capacities at the different application service platforms. Further, the application network session migration controller 158 may be utilized for communication with lower layer functionalities of the application service platform 150, such as a TCP (Transmission Control Protocol) stack, which are involved in providing an application service to be migrated.

As further illustrated, the session migration controller 154 is provided with a Media Independent Handover function (MIHF) 155 and a session migration decision logic 156. The MIHF 155 has the purpose of coordinating the migration of user sessions handled by the application service platform 150 with mobility mechanisms in the cellular network. For this purpose, a fourth interface IF4 is provided between the MIHF 155 and the eNB 110, in particular between the MIHF 155 and a Media Independent Handover User function (MIH-U) 114 in the eNB 110. The session migration decision logic 156 is responsible for deciding whether to migrate one or more of the user sessions 161 or not. For this purpose, a fifth interface IF5 is provided between the session migration decision logic 156 and the eNB 110, in particular between the session migration decision logic 158 and the MIH-U 114.

The eNB 110 provides the MIH-U 112 which is responsible on the eNB side for coordinating the migration of user sessions handled by the application service platform with the mobility mechanisms in the cellular network. In addition, the eNB 110 provides a radio network layer functionality (RNL) 112 which is responsible for handling typical radio network related functionalities of the eNB 110, such as controlling HOs from or to a cell of the cellular network served by the eNB 110. For supporting the coordination of the migration of user sessions handled by the application service platform 150 with mobility mechanisms in the cellular network, a sixth interface IF6 is provided between the RNL 112 and the MIH-U 114 of the eNB 110. The interface IF6 allows for exchange of information between the functionalities of the eNB 110 related to the provision and migration of application services and the typical radio network related functionalities of the eNB 110.

As further illustrated, the eNB 110 provides an interface for coupling to other eNBs of the cellular network. This interface may correspond to the X2 interface for inter-eNB communication as specified in 3GPP TS 36.300 V12.3.0 (2014 September).

The topology database 180 has the purpose of storing information on application services supported by other application service platforms. The topology database 180 may for example be organized in terms of a list of neighboring application service platforms. In this respect, an application service platform is considered to be "neighboring" if the eNB 110 can establish a connection via the X2 interface to an eNB to which this application service platform is functionally associated (in a similar manner as the eNB 110 and the application service platform 150). For each of these neighboring application service platforms, the supported application services are indicated, e.g., in terms of corresponding identifiers.

In some implementations, the topology database may also contain hierarchical information, e.g., by indicating an hierarchical level of the application service platform and/or application services supported on higher hierarchical levels. In this respect, an application service platform uniquely assigned to one eNB may be considered to correspond to the lowest hierarchical level. On the next hierarchical level, an application service platforms may be assigned to multiple eNBs, to each of which also an application service platform of the lowest level may be assigned. In this way, a multi-level hierarchy of application service platforms may be defined. Here, it is to be understood that while the application service platforms of the lowest hierarchical level are typically located directly at a certain eNB and therefore also very close to the UEs, with increasing hierarchical level the locations of the application service platforms shift towards more centralized locations. For example, an application service platform of a higher hierarchical level could be co-located with a transport hub of the radio access network which aggregates traffic towards a core network part of the cellular network.

The topology database 180 may initially be manually supplied with information, e.g., using operations and maintenance procedures. For example, such initially provided information may concern the application services supported on higher hierarchical levels. As will be explained in more detail below, for supplying the information concerning supported application services on the lowest hierarchical level, information exchange between the eNB 110 and other eNBs by messages on the X2 is utilized. For this purpose existing messages of the X2AP as specified in 3GPP 36.423 V12.3.0 (2014 September) may be supplemented with an additional information element. Alternatively or in addition new dedicated messages could be defined for this purpose. To supply the topology database with the information extracted from the messages received by the eNB 110, a seventh interface IF7 is provided between the eNB 110 and the topology database 180. To allow utilization of the information in the topology database when selecting a suitable application service platform at establishment of a new user session of an application service or when controlling migration of a user session of an application service, a eighth interface IF8 is provided between the application service platform 150 and the topology database 180. Through the eighth interface IF8, the application service platform 150 (or functional elements of the application service platform 150 such as the session migration controller 154) may access the topology database 180 and thereby obtain information on the application services supported by other application service platforms.

Figure 2:
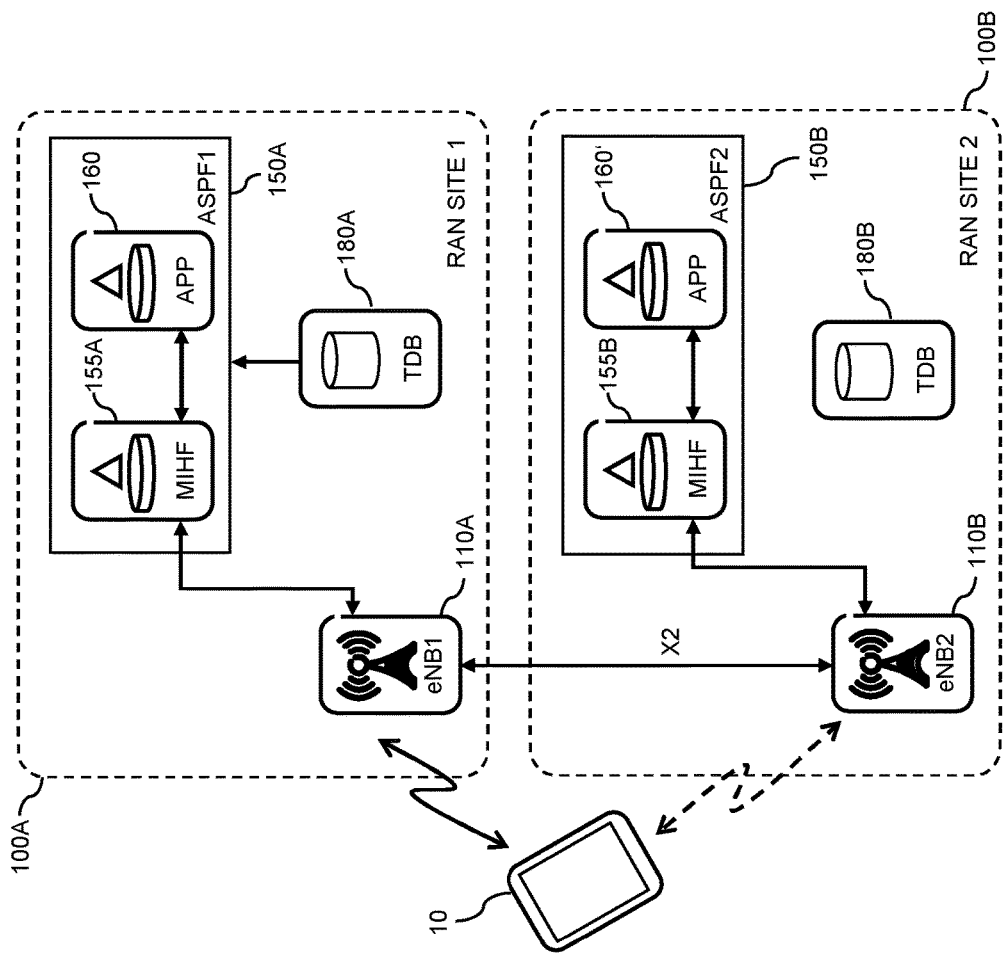
FIG. 2 schematically illustrates an exemplary scenario in which a UE moves between sites of different application service platforms.

FIG. 2 schematically illustrates an exemplary mobility scenario in the information from the topology database may be applied for controlling migration of one or more user sessions of one or more application services between two of the application service platforms. In the scenario of FIG. 2, a handover (HO) of a UE 10 is assumed to be performed from a first RAN site 100A to a second RAN site 100B, which may each be implemented on the basis of the architecture as explained in connection with FIG. 1.

In accordance with the architecture of FIG. 1, the first RAN site 100A thus provides a first eNB 110A, in view of the assumed HO in the following also referred to as source eNB, a first application service platform (ASPF1) 150A coupled to eNB 110A, and a first topology database 180A coupled to the first eNB 110A and the first application service platform 150A. Similarly, the second RAN site 100B provides a second eNB 110B, in view of the assumed HO in the following also referred to as target eNB, a second application service platform (ASPF2) 150B coupled to the second eNB 110B, and a second topology database 180B coupled to the second eNB 110B and the second application service platform 150B.

In accordance with the architecture explained in connection with FIG. 1, the first application service platform 150A is provided with a first MIHF 155A, interacting with a MIH-U (not illustrated) of the first eNB 110A and executes a first set of applications 160. Similarly, the second application service platform 150B is provided with a second MIHF 155B, interacting with a MIH-U (not illustrated) of the second eNB 110B. The second application platform 150B is assumed to execute a second set of applications 160 which may, at least in part, differ from the first set of applications executed by the first application service platform 150A.

Before the HO, the UE 10 is connected via the first eNB 110A to the cellular network, and one or more application services are assumed to be provided by the first application service platform 150A to the UE 10. One or more corresponding user sessions may thus be established by the UE 10 and the first application service platform 150A.

After the HO, the UE 10 will be connected via the second eNB 110B to the cellular network. In view of efficient utilization of transport network capacity and user experience, e.g., with respect to latencies when utilizing the application service(s), migration of the user session(s) from the first application service platform 150A to the second application service platform 150B may thus be desirable. However, such migration is only possible if the application service of the migrated user session is also supported by the second application service platform 150B, i.e., if the corresponding application is part of the second set of application services 160' as executed by the second application service platform 150B. Depending on the information in the first topology database 180A, the first application service platform 150A may decide for each user session whether it should be migrated to the second application service platform 150B or not.

Figure 3:
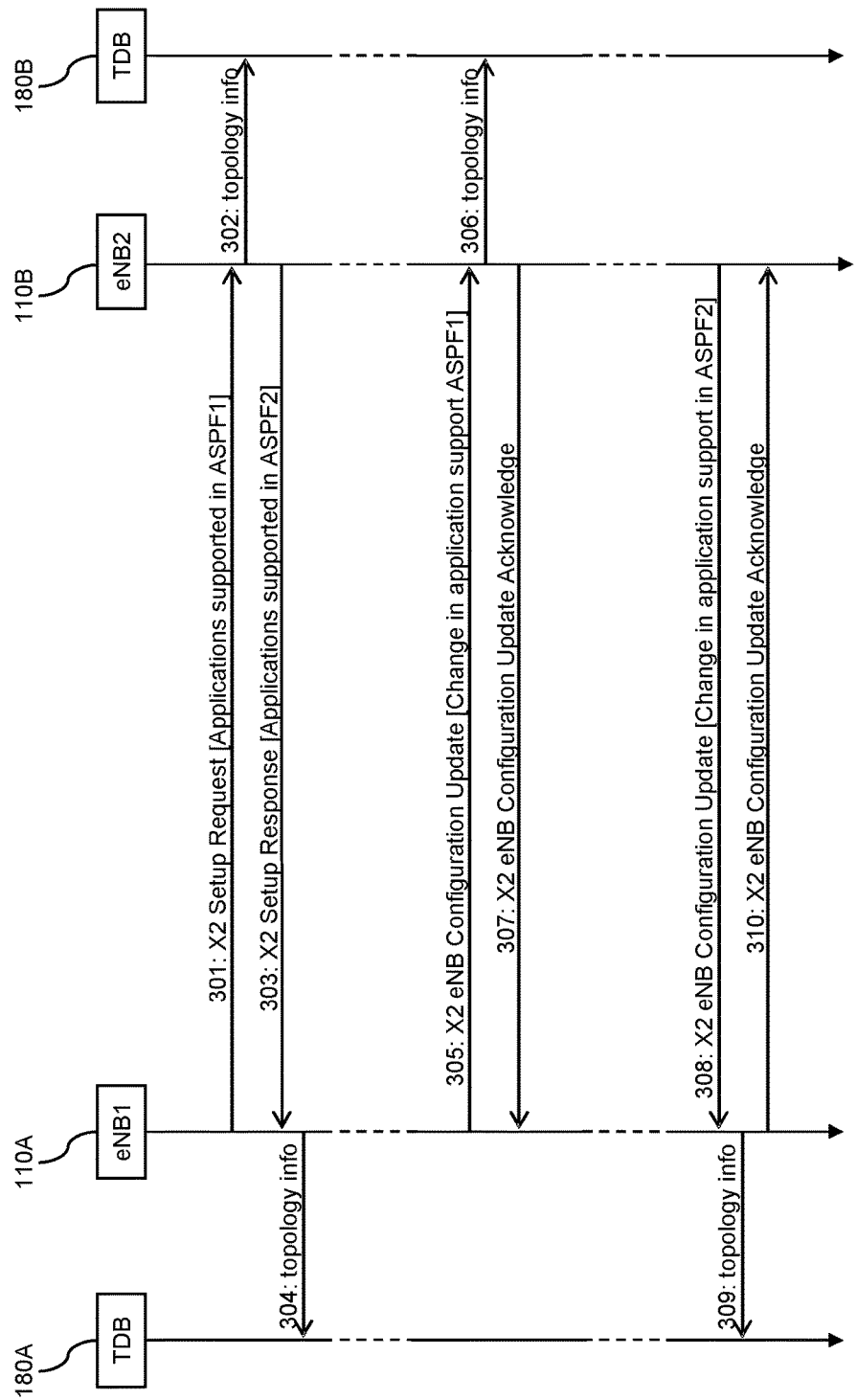
FIG. 3 shows exemplary message flows according to an embodiment of the invention.

FIG. 3 further illustrates exemplary processes in which messages for configuring the X2 connection between the first eNB 110A and the second eNB 110B are used for updating the respective topology databases 180A, 180B. For example, this updating may have occurred before the migration scenario of FIG. 2.

In the processes of FIG. 3, the first eNB 110A initiates establishment of the X2 connection with the second eNB 110B by sending an X2 Setup Request message 301 to the second eNB 110B. The X2 Setup Request message 301 includes an additional information element with topology information indicating the application services supported by the first application service platform 110A at the first eNB 110A.

The second eNB 110B receives the X2 Setup Request message 301, extracts the topology information therefrom, and stores the topology information in the second topology database 180B, as illustrated by message 302.

Further, the second eNB 110B responds to the X2 Setup Request message 301 by sending an X2 Setup Response message 303 to the first eNB 110A. The X2 Setup Response message 303 includes an additional information element with topology information indicating the application services supported by the second application service platform 110B at the second eNB 110B.

The first eNB 110A receives the X2 Setup Response message 303, extracts the topology information therefrom, and stores the topology information in the first topology database 180A, as illustrated by message 304.

At a later time, the application services supported by the first application service platform 110A may change, e.g., because one or more additional application services become supported and/or one or more previously supported application services are no longer supported.

In response to such change in the supported application services, the first eNB 110A sends an X2 Configuration Update message 305 to the second eNB 110B. The X2 Configuration Update message 305 includes an information element with topology information indicating the change in the supported application services, e.g., by indicating no longer supported application services and/or newly supported application services. Alternatively, also a complete set of the currently supported application services could be indicated in the topology information.

The second eNB 110B receives the X2 Configuration Update message 305, extracts the topology information therefrom, and stores the topology information in the second topology database 180B, as illustrated by message 306. Accordingly, the second topology database 180B is updated with respect to the application services now supported by the first application service platform 110A.

Further, the second eNB 110B responds to the X2 Configuration Update message 305 by sending an X2 Configuration Update Acknowledge message 307 to the first eNB 110A.

Further, at some time also the application services supported by the second application service platform 110B may change, e.g., because one or more additional application services become supported and/or one or more previously supported application services are no longer supported.

In response to such change in the supported application services, the second eNB 110B sends an X2 Configuration Update message 308 to the first eNB 110A. The X2 Configuration Update message 308 includes an information element with topology information indicating the change in the supported application services, e.g., by indicating no longer supported application services and/or newly supported application services. Alternatively, also a complete set of the currently supported application services could be indicated in the topology information.

The first eNB 110A receives the X2 Configuration Update message 308, extracts the topology information therefrom, and stores the topology information in the first topology database 180A, as illustrated by message 309. Accordingly, the first topology database 180A is updated with respect to the application services now supported by the second application service platform 110B.

Further, the first eNB 110A responds to the X2 Configuration Update message 309 by sending an X2 Configuration Update Acknowledge message 310 to the second eNB 110B.

It is to be understood that in a typical deployment of distributed application service platforms, numerous eNBs of the cellular network may each exchange information with other eNBs in the manner as illustrated by FIG. 3, thereby achieving mutual updating of topology databases at different sites of the cellular network. Further, it is to be understood that also the X2 Configuration Update Acknowledge message 307 or 310 could be utilized for conveying topology information if needed.

As mentioned above, the topology database may also contain hierarchical information. The cloud hierarchy could have an arbitrary number of levels, ranging from a single level (e.g., application service platforms at access node sites only or only a single "root/top" level with an application service platform in or beyond the core network part) to a multi-level hierarchy with application service platforms in or beyond the core network part, at access node sites, and on one or more hierarchical levels in between, e.g., at hub sites, regional/secondary sites, or the like. When exchanging the topology information between access node sites as explained above, the topology information may be augmented with hierarchical information, e.g., in the form of a list of application service platforms constituting a hierarchical branch leading from the root/top to the concerned application service platform at the access node site. The topology information may for each application service platform contain a list of applications services that are supported by the application service platform. Such information may facilitate finding the lowest application service platform in the hierarchy which supports a certain application service, e.g., when user sessions of such application service are established or migrated.

Figure 4:
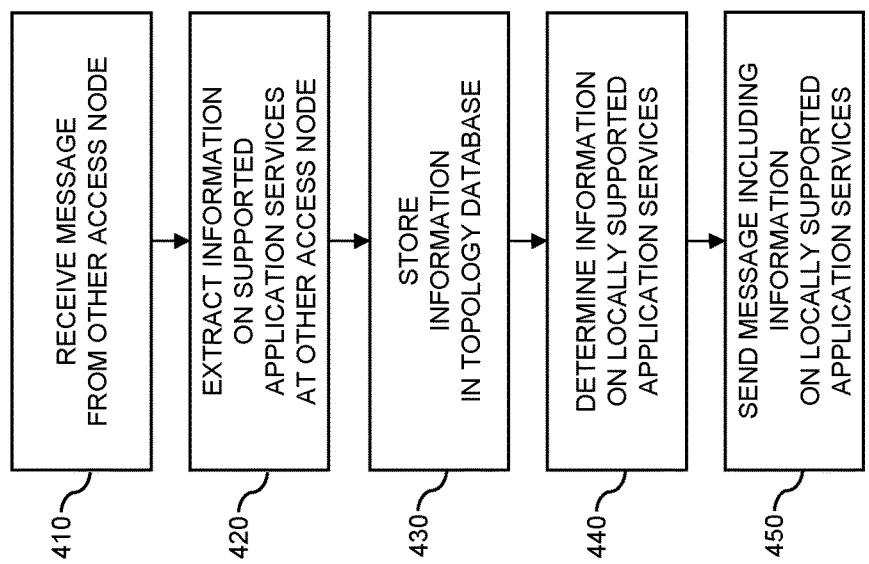
FIG. 4 shows a flowchart for illustrating a method according to an embodiment of the invention.

FIG. 4 shows a flowchart for illustrating a method which may be utilized for implementing the illustrated concepts. The method may be applied for supporting application services provided by multiple application service platforms in a cellular network, such as the application service platforms 150, 150A, 150B. The application service platforms may be located at access nodes of the cellular network, e.g., at base stations such as the above-mentioned eNBs 110, 110A, 110B, or hub nodes of a radio access network of the cellular network. The application service platforms and/or further application service platform may be co-located with the respective access node. In some scenarios, the application service platform and/or the further application service platform may also be integrated with the respective access node in the same network node.

At step 410, an access node of the cellular network receives a message from a further access node of the cellular network. The message may be received via an X2 interface with respect to the further access node.

The message may include information for configuring a connection between the access node and the further access node, e.g., in the form of one or more instructions and/or configuration data. Examples of such messages are the above-mentioned messages 301, 303, 305, 307, 308, 310, utilized for configuring an X2 connection between two eNBs. The message may for example be a request for setting up the connection, such as the message 301, a response to a request for setting up the connection, such as the message 303, a request for updating configuration of the connection, such as the messages 305 and 308, or a response to a request for updating configuration of the connection, such as the messages 307 and 310.

At step 420, the access node extracts topology information from the received message. The topology information indicates one or more application services provided by an application service platform located at the further access node. The application services may for example be indicated by corresponding identifiers.

In some scenarios, the topology information may also indicate application services supported on a higher hierarchical level than the application service platform at the further access node.

At step 430, the access node stores the topology information in a topology database, such as the above-mentioned topology database 180, 180A, or 180B.

In some scenarios, the access node may also provide topology information to one or more other access nodes. For example, the access node may provide topology information to the further access node, thereby implementing a bi-directional change of topology information between the access node and the further access node may be performed. For proving the topology information to one or more other access nodes, steps 440 and 450 may be performed.

At step 440, the access node determines further topology information indicating one or more application services supported by an application service platform at the access node. The application services may for example be indicated by corresponding identifiers.

In some scenarios, the further topology information may also indicate application services supported on a higher hierarchical level than the application service platform at the access node.

At step 450, the access node includes the further topology information into a further message and sends the further message to one or more other access nodes, e.g., to the further access node. The further message may be sent via an X2 interface with respect to such other access node.

The further message may include data for configuring a connection between the access node and the other access node, e.g., in the form of one or more instructions and/or configuration data. Examples of such messages are the above-mentioned messages 301, 303, 305, 307, 308, 310, utilized for configuring an X2 connection between two eNBs. The further message may for example be a request for setting up the connection, such as the message 301, a response to a request for setting up the connection, such as the message 303, a request for updating configuration of the connection, such as the messages 305 and 308, or a response to a request for updating configuration of the connection, such as the messages 307 and 310.

In view of the above, an access node for implementing the above-described concepts may be provided with the following modules: a module for receiving a message from a further access node of the cellular network, e.g., as explained in connection with step 410 of FIG. 4, a module for extracting, from the received message, topology information indicating one or more application services provided by an application service platform located at the further access node, e.g., as explained in connection with step 420 of FIG. 4, and a module for storing the topology information in a topology database, e.g., as explained in connection with step 430 of FIG. 4. Further, the access node may also be provided with a module for determining further topology information indicating one or more application services supported by an application service platform, e.g., as explained in connection with step 440 of FIG. 4, a module for including the further topology information into a further message, and a module for sending the further message to the further access node, e.g., as explained in connection with step 450 of FIG. 4.

Figure 5:
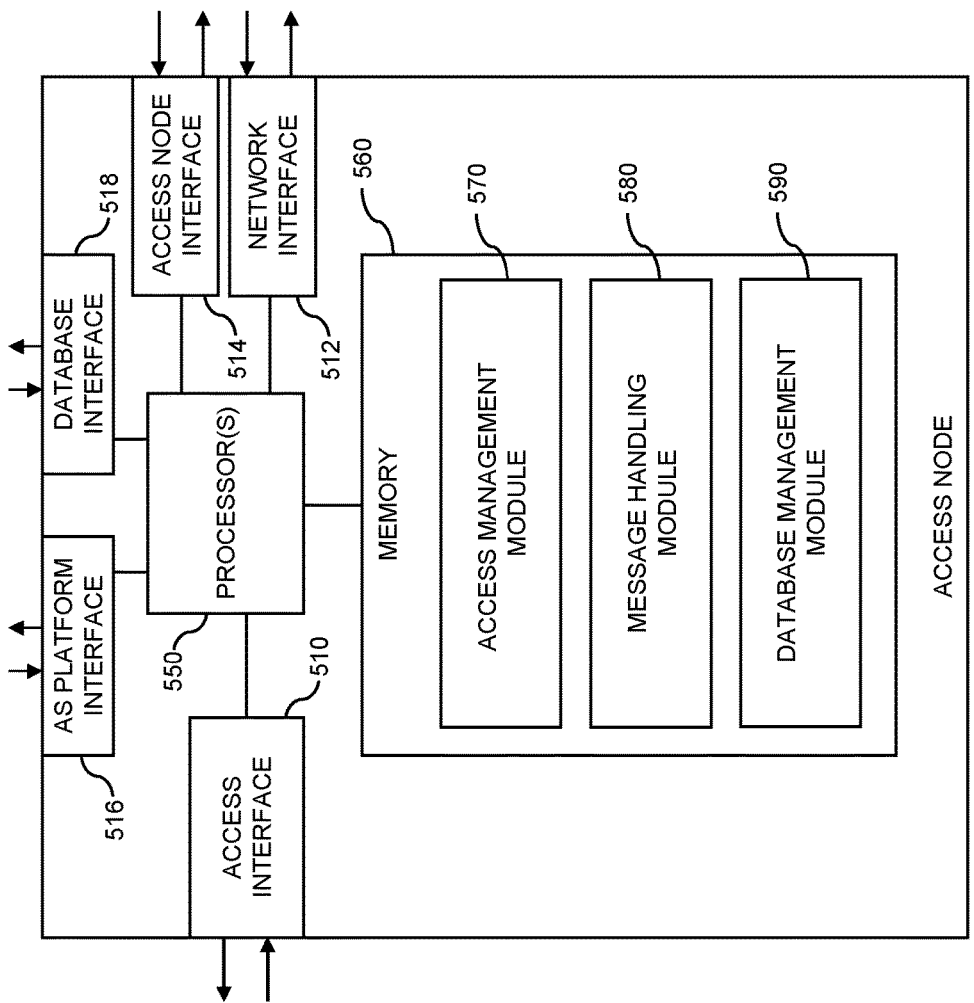
FIG. 5 schematically illustrates an access node according to an embodiment of the invention.

FIG. 5 illustrates exemplary structures which may be used for implementing the above concepts in an access node for a cellular network, e.g., in the access node or further access node of the method of FIG. 4.

As illustrated, the access node may include an access interface 510 for connecting to one or more UEs, such as the UE 10. If the access node is a base station, the access interface 510 may correspond to a radio interface. If the access node is intended for deployment at a more centralized site within a RAN of the cellular network, such as an RNC, the access interface 510 may have the purpose of connecting the access node via a base station of the cellular network to one or more UEs. As further illustrated, the access node may include a network interface 512 for connecting to a core network part of the cellular network. The network interface 512 may for example correspond to the S1 interface as for example specified in 3GPP TS 3GPP TS 36.300 V12.3.0. Further, the access node may include an access node interface 514 for connecting to other access nodes of the cellular network. The access node interface 514 may for example correspond to the above-mentioned X2 interface. As further illustrated, the access node may include an application service platform interface 516 for connecting to an application service platform, such as the above-mentioned application service platform 150, 150A, or 150B. As further illustrated, the access node may include a database interface 518 for connecting to a topology database, such as the above-mentioned topology database 180, 180A, or 180B.

Further, the access node includes processing circuitry, e.g., in the form of one or more processors 550 coupled to the interfaces 510, 512, 514, 516, 518, and a memory 560 coupled to the processor(s) 550. The memory 560 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 560 includes suitably configured program code to be executed by the processor(s) 550 so as to implement the above-described functionalities of the access node. In particular, the memory 560 may include various program code modules for causing the access node to perform processes as described above, e.g., corresponding to the method steps of FIG. 4.

As illustrated, the memory 560 may include an access management module 570 for implementing functionalities of providing and controlling access of one or more UEs to the cellular network. Further, the memory 560 may include a message handling module 580 for implementing the above-described functionalities of sending messages to another access node and/or receiving messages from another access node, and of processing such messages, e.g., to extract or insert the topology information. Further, the memory 560 may include a database management module 590 for implementing the above-mentioned functionalities of storing the topology information in the topology database.

It is to be understood that the structures as illustrated in FIG. 5 are merely schematic and that the access node may actually include further components which, for the sake of clarity, have not been illustrated, e.g., further interfaces or processors. Also, it is to be understood that the memory 560 may include further types of program code modules, which have not been illustrated, e.g., program code modules for implementing known functionalities of an access node of a cellular network, e.g., known functionalities of an eNB. According to some embodiments, also a computer program may be provided for implementing functionalities of the access node, e.g., in the form of a physical medium storing the program code and/or other data to be stored in the memory 560 or by making the program code available for download or by streaming.

As can be seen, the concepts as described above may be used for efficiently supporting application services in a cellular network. In particular, a topology database may be efficiently supplied with information concerning which application services are supported by application service platforms localized at other access nodes. Laborious manual provisioning of such information may thus be avoided.

It is to be understood that the examples and embodiments as explained above are merely illustrative and susceptible to various modifications. For example, the illustrated concepts may be applied in connection with various radio access technologies, without limitation to the above-mentioned example of the LTE radio access technology. Further, the illustrated concepts may be applied in connection with various kinds of access nodes, including base stations, base station controllers, or transport hub nodes of a RAN. Depending on the kind of utilized access node, also different types of interfaces for inter-access node communication may be utilized for implementing the message exchange for conveying the topology information. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method, in an access node of a cellular network, of supporting application services in the cellular network, the method comprising:
receiving a message from a further access node of the cellular network;
extracting, from the received message, topology information indicating one or more application services provided by an application service platform located at the further access node;
storing the topology information in a topology database;
determining further topology information indicating one or more application services supported by an application service platform located at the access node;
including the further topology information into a further message; and
sending the further message to the further access node of the cellular network,
wherein the further topology information further indicates application services supported on a higher hierarchical level than the application service platform located at the access node, wherein the message is received via an X2 Setup Request message, an X2 Setup Response message, an X2 evolved Node B (eNB) Configuration Update message, or an X2 eNB Configuration Acknowledge message, and wherein the further message is sent via an X2 Setup Request message, an X2 Setup Response message, an X2 eNB Configuration Update message, or an X2 eNB Configuration Acknowledge message.

2. The method according to claim 1, wherein the message comprises information for configuring a connection between the access node and the further access node.

3. The method according to claim 2, wherein the message is one of: a request for setting up the connection, a response to the request for setting up the connection, a request for updating configuration of the connection, and a response to the request for updating the configuration of the connection.

4. The method according to claim 1, wherein the further message comprises information for configuring a connection between the access node and the further access node.

5. The method according to claim 4, wherein the further message is one of: a request for setting up the connection, a response to the request for setting up the connection, a request for updating configuration of the connection, and a response to the request for updating the configuration of the connection.

6. The method according to claim 1, wherein the topology information further indicates application services supported on a higher hierarchical level than the application service platform located at the further access node.

7. The method according to claim 1, wherein the message is further received via an X2 interface with respect to the further access node.

8. An access node configured for an operation in a cellular network, the access node comprising:
communication interface circuitry configured to communicate with a further access node of the cellular network; and
processing circuitry operatively associated with the communication interface circuitry, wherein the processing circuitry is configured to:
receive, via an interface, a message from the further access node;
extract, from the received message, topology information indicating one or more application services provided by an application service platform located at the further access node;
store the topology information in a topology database;
determine further topology information indicating one or more application services supported by an application service platform located at the access node;
include the further topology information into a further message; and
send the further message, via the interface, to the further access node,
wherein the further topology information further indicates application services supported on a higher hierarchical level than the application service platform located at the access node, wherein the message is received via an X2 Setup Request message, an X2 Setup Response message, an X2 evolved Node B (eNB) Configuration Update message, or an X2 eNB Configuration Acknowledge message, and wherein the further message is sent via an X2 Setup Request message, an X2 Setup Response message, an X2 eNB Configuration Update message, or an X2 eNB Configuration Acknowledge message.

9. The access node according to claim 8, wherein the message comprises information for configuring a connection between the access node and the further access node.

10. The access node according to claim 9, wherein the message is one of: a request for setting up the connection, a response to the request for setting up the connection, a request for updating configuration of the connection, and a response to the request for updating the configuration of the connection.

11. The access node according to claim 8, wherein the further message comprises information for configuring a connection between the access node and the further access node.

12. The access node according to claim 11, wherein the further message is a request for setting up the connection, a response to the request for setting up the connection, a request for updating configuration of the connection, or a response to the request for updating the configuration of the connection.

13. The access node according to claim 8, wherein the topology information further indicates application services supported on a higher hierarchical level than the application service platform located at the further access node.

14. The access node according to claim 8, wherein the communication interface circuitry is further configured to implement an X2 interface with respect to the further access node.

15. A non-transitory computer readable medium storing a computer program for supporting application services in a cellular network, the computer program comprising program code to be executed by at least one processor of an access node of the cellular network, wherein the execution of the program code causes the access node to:

receive a message from a further access node of the cellular network;

extract, from the received message, topology information indicating one or more application services provided by an application service platform located at the further access node;

store the topology information in a topology database;

determine further topology information indicating one or more application services supported by an application service platform located at the access node;

include the further topology information into a further message; and send the further message to the further access node of the cellular network, wherein the further topology information further indicates application services supported on a higher hierarchical level than the application service platform located at the access node, wherein the message is received via an X2 Setup Request message, an X2 Setup Response message, an X2 evolved Node B (eNB) Configuration Update message, or an X2 eNB Configuration Acknowledge message, and wherein the further message is sent via an X2 Setup Request message, an X2 Setup Response message, an X2 eNB Configuration Update message, or an X2 eNB Configuration Acknowledge message.

* * * * *